May 3, 1966 H. RENKER 3,248,966
CONTROL CAM CONNECTION, ESPECIALLY FOR PROGRAM MEMORIZERS
Filed Jan. 31, 1964
FIG-1
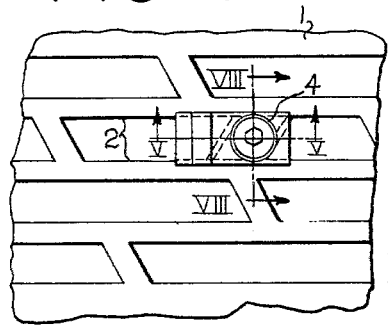
FIG-3
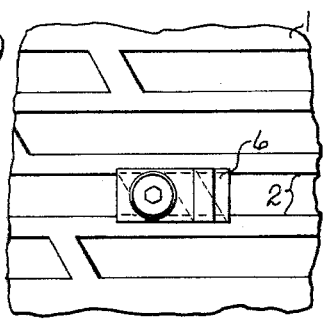
FIG-2
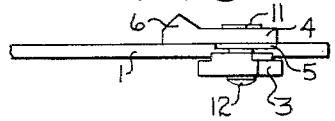
FIG-4
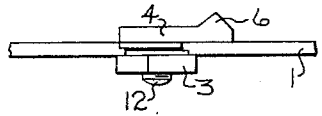
FIG-5
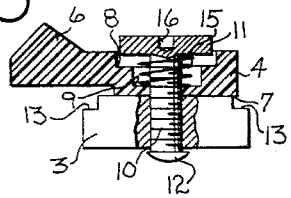
FIG-6
FIG-6A
FIG-6B
FIG-7
FIG-7A
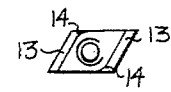
FIG-8
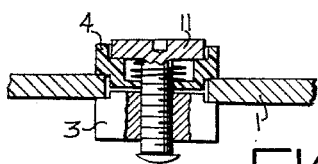
INVENTOR.
Hansjörg Renker
BY

United States Patent Office 3,248,966
Patented May 3, 1966

3,248,966
CONTROL CAM CONNECTION, ESPECIALLY FOR PROGRAM MEMORIZERS
Hansjörg Renker, Schaffhausen, Switzerland, assignor to Georg Fischer Aktiengesellschaft, Schaffhausen, Switzerland
Filed Jan. 31, 1964, Ser. No. 341,577
Claims priority, application Switzerland, Feb. 12, 1963, 1,728/63
11 Claims. (Cl. 74—568)

The present invention relates to a device for machine tools for memorizing a working program, and, in particular, is directed to the design of a control cam and a plate to which the control cams are connected.

In connection with program memorizing for machine tools, it is known to provide rails in a plurality of rows and to firmly connect all of said rails with a frame while control cams may be connected to said rails at any desired place thereof. Devices of this type, however, have various drawbacks. Foremost in this connection is the way of connecting the control cams to the rails which connection requires a considerable number of connecting and securing elements in order to make sure that the cam will not accidentally detach itself from the respective rail. Another drawback of the above heretofore known arrangement consists in the size of the control cams, inasmuch as when employing the said control system, and in view of the number of different control possibilities, space is at a premium. Finally, the entire memorizing system, frames with rails and the like is rather bulky and expensive.

It is, therefore, an object of the present invention to provide a program memorizer of the above mentioned general type, which will overcome the above mentioned drawbacks.

It is another object of this invention to provide a program memorizer which is relatively simple in construction and requires a minimum of parts.

These and other objects and advantages of the invention will appear more clearly from the following specification in connection with the accompanying drawing, in which:

FIG. 1 shows a top view of a control cam inserted in the memorizer according to the invention.

FIG. 2 is a front view of the control cam shown in FIG. 1.

FIG. 3 is a top view of a control cam clamped to the memorizer according to the invention.

FIG. 4 shows a front view of the control cam of FIG. 3.

FIG. 5 is a cross section taken along the line V—V of FIG. 1 through the control cam shown therein, the scale of FIG. 5, however, being considerably larger than that of FIG. 1.

FIGS. 6, 6a and 6b respectively show in top view, front view and side view a slide with a cam in conformity with the present invention.

FIGS. 7 and 7a respectively show in top view and front view a rhomboidal nut for use in connection with the present invention.

FIG. 8 is a cross section taken along the line VIII—VIII of FIG. 1 through the control cam shown therein, the scale of FIG. 8, however, being considerably larger than that of FIG. 1.

More specifically, the present invention is directed to a program memorizer with a guiding plate provided with longitudinal slots and with control cams connectable to said plate. The memorizer according to the invention is characterized in that the guiding plate is provided with oblong openings which are preferably arranged in series and of rhomboidal shape. At least one control cam is, by means of a screw, a rhomboidal-shaped nut having steps, and a spring selectively detachable from and connectable to the portions confining said opening. Furthermore it shall be remarked, that the shape of the oblong openings has been chosen advantageously rhomboidal because of the smallest possible setting-angle. The term "setting-angle" relates to the angle between which a nut can be turned in a clockwise or counter clockwise direction within an oblong opening.

A further feature of the invention is to be seen in the fact that the control cam arranged on one side of the memorizer has an abutment adapted to prevent said control cam from turning, the arrangement being such that spring means are provided between the control cam and the head of the connecting screw.

Referring now to the drawing in detail; the embodiment shown in FIGS. 1 and 2 comprises a nut 3 which pertains to the control cam and has been inserted into one of the oblong openings 2 of the guiding plate 1 of the memorizer. In this position, the control cam comprising the parts 3–17 is displaceable in longitudinal direction within an oblong opening 2. A lateral turning of the control cam is impossible because slide 4 has an abutment 5 preventing the control cam from turning.

The slide 4 which may be made of a synthetic material such as, for instance, polyacetal or polyamid has provided thereon a cam for actuating a push rod (not illustrated in the drawing). Slide 4 is provided with a bore 7 forming two annular supporting surfaces 8 and 9. A screw 10 provided with an inner hexagonal recess 16 extends through bore 7 and has screwed thereonto a rhomboidal nut 3 provided with two steps 13. As will be seen from the drawing, screw head 11 rests on a spring 15 which in its turn rests on the surface 9 of slide 4. The lower end of screw 10 has connected thereto safety means 12 to prevent nut 3 from getting detached from screw 10. Such safety means may consist of, for instance, riveting or hammering over the end of the screw threads 10.

In order to clamp slide 4 by means of screw 10 and nut 3 to the guiding plate 1 of the memorizer, screw 10 is first pressed downwardly onto the supporting surface 8 of slide 4 against the thrust of spring 15. By subsequently turning screw 10 by means of a wrench, nut 3 is turned clockwise (see FIGS. 3 and 4) by approximately 60°, i.e. until the two edges of the two steps 13 engage the edges of the oblong openings 2. Each step 13 is provided with a rounded portion 14 merging with the longitudinal sides of the nut, whereby it will be possible to turn the nut 3 in clockwise or counterclockwise direction within oblong opening 2 by approximately 60°. In the now arrested position (FIG. 8) nut 3 is prevented from further rotation with screw 10 while when further screwing screw 10 into nut 3, slide 4 and nut 3 will be clamped to the guiding plate 1, in this connection, screw 10 is tightened against the thrust of spring 15 until the control cam has been firmly clamped to the guiding plate 1. For purposes of loosening slide 4 from guiding plate 1, it is merely necessary to turn screw 10 in counterclockwise direction. Nut 3 will be turned back by 60° as shown in FIGS. 1 and 2 and arrests itself automatically at the edges of the oblong openings 2. In this position of nut 3, slide 4 may be displaced into any desired position within the range of a longitudinal opening 2, or nut 3 may be lifted out of this range. By means of spring 15, nut 3 will also, in loosened positioned, be lifted against the lower surface of slide 4 as will be evident from FIG. 5. The purpose of this arrangement consists in that the nut 3 with the edges of steps 13 will immediately at the start of the tightening of screw 10 be arrested on the edges of the oblong opening.

It is, of course, to be understood that the present invention is, by no means, limited to the particular arrange-

What I claim is:

1. For use in connection with a program memorizer: guiding plate means having preferably rhomboid-shaped slot means at least one cam member provided with an extension slidably guided in said slot means, and connecting means operatively connected to said cam member and operable selectively to connect said cam member to and disconnect the same from said plate means, said connecting means including a screw having a head above a portion of said cam member and having a threaded shank connected to said head and rotatably extending through said cam member and said slot means, said connecting means also including a nut threadedly engaging said shank and having a preferably peripheral rhomboid-shaped contour with the longer sides thereof spaced from each other by a distance less than the width of said slot means and with the shorter sides of said rhomboid-shaped contour spaced from each other by a distance in excess of the width of said slot means, and spring means operatively connected to said cam member and said nut for continuously urging the same relatively toward each other.

2. An arrangement according to claim 1, in which said shorter sides of said rhomboid-shaped nut are provided with shoulders for engagement with said plate means.

3. An arrangement according to claim 1, in which said guiding plate means is provided with a plurality of rows of slot means, said rows extending alongside and parallel to each other in longitudinal direction of said plate means.

4. An arrangement according to claim 1, in which said extension includes means engaging the slot means confining walls for preventing rotation of said cam member in said slot means.

5. An arrangement according to claim 1, in which said cam member is made of synthetic material, e.g. polyacetal or polyamid.

6. For use in connection with a program memorizer: longitudinal guiding plate means having slot means extending in the longitudinal direction of said plate means, at least one cam member provided with an extension slidably guided in said slot means and provided with a recess, and connecting means operatively connected to said cam member and operable selectively to connect said cam member to and disconnect the same from said plate means, said connecting means including a screw having its head in substantial alignment with said recess and having a threaded shank connected to said head and rotatably extending through said recess and said cam member and through said slot means, said connecting means also including a nut threadedly engaging said shank and having a preferably peripheral rhomboid-shaped contour with the longer sides thereof spaced from each other by a distance less than the width of said slot means and with the shorter sides of said rhomboid-shaped contour spaced from each other by a distance in excess of the width of said slot means, and spring means having one end portion resting in said recess and having its other end portion acting upon said head for continuously urging said nut toward said cam member.

7. An arrangement according to claim 6, in which said head is provided with a polygonal recess for receiving an adjusting wrench.

8. An arrangement according to claim 1, which includes means connected to that end of said shank which is remote from said head for preventing accidental disengagement of said nut from said shank.

9. An arrangement according to claim 1, in which the narrow sides of said rhomboid-shaped nut are provided with step-shaped cutouts extending along the entire length of said narrow sides so that each narrow end portion of the nut has two edges, one set back with regard to the other, each of said set back edges having at least one rounded corner merging with the respective adjacent long side of said rhomboid-shaped nut.

10. For use in connection with a program memorizer: longitudinal guiding plate means having slot means extending in the longitudinal direction of said plate means, at least one cam member provided with an extension slidably guided in said slot means, and connecting means operatively connected to said cam member and operable selectively to connect said cam member to and disconnect the same from said plate means, said connecting means including a screw having a head above a portion of said cam member and having a threaded shank connected to said head and rotatably extending through said cam member and said slot means, said connecting means also including a nut threadedly engaging said shank and in the plane perpendicular thereto having a length in excess of said slot means and a width less than said slot means, and spring means continuously acting upon said nut for continuously urging the same toward said cam member.

11. An arrangement according to claim 10 in which said plate means and said nut are provided with means interengaging each other in the position in which the longitudinal extension of said nut is transverse to the longitudinal extension of said slot means to thereby prevent said nut from turning in the tightening direction of said screw.

References Cited by the Examiner
UNITED STATES PATENTS

| | | | |
|---|---|---|---|
| 2,006,144 | 6/1935 | Lovely | 82—34.1 |
| 2,362,664 | 11/1944 | Reed | 287—94 |
| 3,173,308 | 3/1965 | Wollenhaupt et al. | 74—568 |

BROUGHTON G. DURHAM, *Primary Examiner.*

W. S. RATLIFF, *Assistant Examiner.*